United States Patent [19]
Sommer

[11] Patent Number: 5,921,361
[45] Date of Patent: Jul. 13, 1999

[54] PRESS DRIVE WITH OIL SHEAR CLUTCH/ BRAKE DRIVES

[75] Inventor: Gordon Maurice Sommer, Grosse Pointe Shores, Mich.

[73] Assignee: Midwest Brake Bond Company, Warren, Mich.

[21] Appl. No.: 08/899,994

[22] Filed: Jul. 24, 1997

[51] Int. Cl.⁶ .............................. F16D 67/04; F16D 13/72
[52] U.S. Cl. ................ 192/18 A; 192/70.12; 192/113.34
[58] Field of Search ................................ 192/18 R, 18 A, 192/70.12, 113.34

[56] References Cited

U.S. PATENT DOCUMENTS

| | | |
|---|---|---|
| 2,242,396 | 5/1941 | Johansen . |
| 2,848,082 | 8/1958 | Dehn . |
| 3,441,114 | 4/1969 | Pensa . |
| 3,713,517 | 1/1973 | Sommer . |
| 4,095,523 | 6/1978 | Drungil . |
| 4,135,611 | 1/1979 | Spanke .................................. 192/18 A |
| 4,275,607 | 6/1981 | Snoy .................................. 192/18 A X |
| 4,346,796 | 8/1982 | Ueno . |
| 4,432,443 | 2/1984 | Sommer . |
| 4,562,907 | 1/1986 | Maeda . |
| 4,693,350 | 9/1987 | Sommer . |
| 4,720,929 | 1/1988 | Umberson ........................ 192/70.12 X |
| 4,736,821 | 4/1988 | Ries ............................... 192/113.34 X |
| 5,174,420 | 12/1992 | DeWald et al. .................. 192/70.12 X |
| 5,190,129 | 3/1993 | Sommer . |
| 5,291,977 | 3/1994 | Sommer . |
| 5,769,187 | 6/1998 | Sommer ............................ 192/18 A X |

*Primary Examiner*—Richard M. Lorence
*Attorney, Agent, or Firm*—Harness, Dickey & Pierce, PLC

[57] ABSTRACT

A drive unit for a press uses an oil shear brake unit and an oil shear clutch unit. The actuation of the brake unit and the clutch unit occurs simultaneously due to a common activation member. The oil cooling system for the drive unit feeds oil to the outer radial or circumferential portion of the drive and returns oil for the central portion of the drive. The reverse flow of oil provides a more consistent supply of cooling oil to remove heat and lubricate the various components of the drive unit to significantly improve the operating performance of the drive.

11 Claims, 1 Drawing Sheet

PRESS DRIVE WITH OIL SHEAR CLUTCH/ BRAKE DRIVES

FIELD OF THE INVENTION

The present invention relates to press drives. More particularly the present invention relates to a single speed press drive using an oil shear clutch unit, an oil shear brake unit and a unique system for providing oil to these two units.

BACKGROUND OF THE INVENTION

Dry friction clutch/brakes depend upon the rubbing of a dry friction material against dry reaction members to start and stop a press. This continuous dry rubbing causes wearing of both the friction material and the reaction members as well as causing the generation of heat in these members. The faster the press operates and the faster the flywheel rotates, greater is the amount of wear and heat which are generated. This generation of wear and heat requires periodic gap adjustment between the friction plates and the reaction members to keep the clutch/brakes functioning and the press operating correctly. The trip rate or cycle speed of a press equipped with a dry friction clutch/brake unit is limited because the mass of the unit determines its heat dissipation capacity. If the mass of the unit is increased to increase its heat dissipation capacity, the inertia that must be started and stopped is also increased. These factors define a closed loop from which it is impossible to escape when trying to substantially increase the performance of the system.

Press drives incorporating oil shear brake and clutch units have been developed to eliminate the problems associated with the dry friction type of units. The oil shear systems use hydraulic actuation instead of air actuation and the units have been developed with key modules which can be easily adapted to be mated with the various types of presses. Properly designed oil shear clutch/brake drives offer the advantage of little or no wear of plates in the disk stacks and no brake fade. This provides a more precise operation of the press and dramatically increases press up-time. The oil film between the adjacent disks carries the heat generated by the start-stops of the unit away from the disk stacks. This removal of heat offers the advantage that there is now no practical limit for the press trip rate and the flywheel speed. In addition, this removal of heat provides unlimited inching capabilities.

While these oil shear clutch/brake drive units have significantly improved the operation of the units, providing a continuous and adequate supply of coolant oil to these oil shear clutch/brake drive units has been the subject of continuous development. Originally, cooling oil was supplied to the inner diameter of the clutch and the brake and was removed from the outer circumferential area of the clutch and brake. The cooling oil thus flowed in the same direction as the centrifugal force exerted on the cooling oil by the rotation of the components of the clutch/brake units. Experimentation has shown that by reversing the flow of oil, such that the oil flows against the centrifugal force exerted upon the cooling oil by rotation of the components of the clutch/ brake units, an improved lubrication system can be obtained. Accordingly, what is needed is a design for a press drive which is capable of reversing the flow of cooling oil to the brake and clutch units in the press drive.

SUMMARY OF THE INVENTION

The present invention provides the art with a press drive system which uses an oil shear brake and an oil shear clutch drive. The clutch system of the present invention uses a disk stack of multiple disks to drive an input shaft of the press from a rotating flywheel. The brake system of the present invention also uses a disk stack of multiple disks to prohibit rotation of the input shaft and lock the input shaft to a stationary member. The oil shear system of the present invention utilizes all the advantages associated with the oil shear technology while providing for the cooling oil to be supplied from the outer circumferential portion of the multiple disks and removing the cooling oil from the inner diameter of the multiple disks. This direction of flow of oil is against the centrifugal force exerted on the cooling oil by the rotating components of the press drive system which results in an improved supply of cooling oil to the friction surfaces of the multiple disks.

Other advantages and objects of the present invention will become apparent to those skilled in the art from the subsequent detailed description, appended claims and drawings.

BRIEF DESCRIPTION OF THE DRAWINGS

In the drawing which illustrates the best mode presently contemplated for carrying out the present invention.

DETAILED DESCRIPTION OF THE PREFERRED EMBODIMENT

Figure 1:
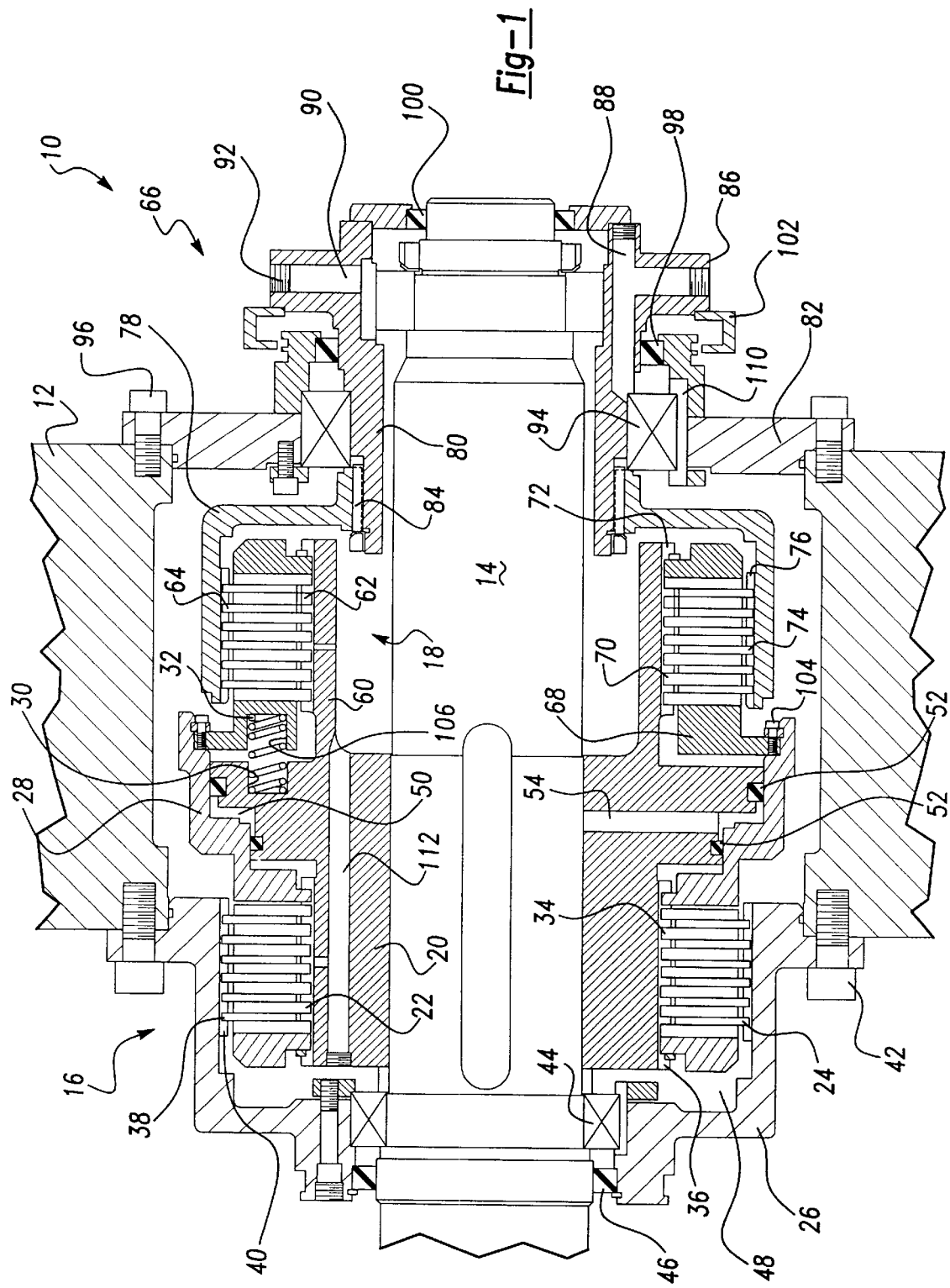
FIG. 1 is a side view, partially in cross section, of a press drive including an oil shear brake and clutch unit in accordance with the present invention.

Referring now to the drawing there is shown in FIG. 1 a press drive in accordance with the present invention which is designated generally by the reference numeral 10. The embodiment described below is shown for exemplary purposes incorporated into a press (not shown) having a flywheel 12 and an input shaft 14. Press drive 10 and the unique oil distribution system can be incorporated into other designs of presses of desired.

Referring now to FIG. 1, press drive 10 includes a clutch assembly 16 and a brake assembly 18. Clutch assembly 16 comprises a clutch reaction hub 20 a plurality of clutch friction plates 22, a plurality of clutch reaction plates 24, a clutch housing 26 and a clutch engagement member 28. Clutch reaction hub 20 is drivingly connected to input shaft 14 of the press to which press drive 10 is assembled to by means known in the art. Clutch hub 20 defines a plurality of spring pockets 30 within which are disposed a plurality of springs 32 for biasing clutch assembly 16 into its disengaged condition and brake assembly 18 into its applied condition.

The plurality of clutch friction plates 22 have spline means 34 located on their interior surface for the engagement with spline means 36 located on the exterior surface of hub 20. The spline engagement between plates 22 and hub 20 is such that plates 22 and hub 20 rotate together but plates 22 are allowed to move axially along spline means 36. Interjected or interleaved between the plurality of clutch friction plates 22 are the plurality of clutch reaction plates 24. Clutch reaction plates 24 have spline means 38 located on their exterior surface for the engagement with spline means 40 located on the interior of clutch housing 26. The engagement between plates 24 and housing 26 is such that plates 24 and housing 26 rotate together but plates 24 are allowed to move axially along spline means 40.

Clutch housing 26 is secured to flywheel 12 by a plurality of bolts 42. A bearing 44 provides for the rotation of housing 26 and flywheel 12 with respect to input shaft 14. A seal 46 isolates a chamber 48 which is partially formed by housing 26 and flywheel 12. Chamber 48 is a sealed chamber within which is disposed clutch assembly 16, brake assembly 18 and cooling oil for lubrication and cooling of the various components of press drive 10.

Clutch engagement member 28 is disposed within chamber 48 and is slidingly received over and moves axially along clutch hub 20. Clutch engagement member 28 and clutch hub 20 define an activation chamber 50. A pair of seals 52 isolate chamber 50 from chamber 48. An activation passage 54 extends through clutch hub 20 and into input shaft 14 to provide access to chamber 50 in order to move clutch assembly 16 between its disengaged and engaged condition and brake assembly 18 between its applied and released condition as will be described later herein. Access to chamber 50 is provided by a fluid passage (not shown) which extends through input shaft 14 which is in fluid communication with some type of rotary union (not shown) as is known in the art.

The operation of clutch assembly 16 begins with clutch assembly 16 being in the disengaged condition due to the biasing of engagement member 28 away from friction plates 22 and reaction plates 24 or to the right as shown in FIG. 1. In this disengaged condition, flywheel 12 is free to rotate with respect to input shaft 14 due to the fact that the plurality of friction plates 22 are free to rotate relative to the plurality of reaction plates 24. When it is desired to power input shaft 14 by flywheel 12, fluid under pressure is supplied to chamber 50 through passage 54. Pressurized fluid within chamber 50 causes engagement member 28 to move axially to the left as shown in FIG. 1 against the biasing of coil springs 32. When engagement member 28 moves to the left, the plurality of friction plates 22 are urged against the plurality of reaction plates 24 causing engagement of clutch assembly 16 and the transferring of power from flywheel 12 to input shaft 14. When the pressurized fluid is released from chamber 50, clutch assembly 16 is again urged into its disengaged condition due to the biasing of coil springs 32.

Brake assembly 18 comprises a brake reaction hub 60, a plurality of brake friction plates 62, a plurality of brake reaction plates 64, a brake housing assembly 66 and a brake application member 68. Brake reaction hub 60 is integral with clutch reaction hub 20 and thus is drivingly connected to input shaft 14. While brake reaction hub 60 is shown as being integral with clutch reaction hub 20, brake reaction hub 60 could be a separate member drivingly connected to input shaft 14 if desired.

The plurality of brake friction plates 62 have spline means 70 located on their interior surface of engagement with spline means 72 disposed on the exterior of hub 60. The spline engagement between plates 62 and hub 60 is such that plates 62 and hub 60 rotate together but plates 62 are allowed to move axially along spline means 72. Interjected or interleaved between the plurality of brake friction plates 62 are the plurality of brake reaction plates 64. Brake reaction plates 64 have spline means 74 located on their exterior surface for engagement with spline means 76 located on the interior of brake housing assembly 66. The engagement between plates 64 and housing assembly 66 is such that plates 64 are prohibited from rotating with respect to housing assembly 66 but plates 64 are allowed to move axially along spline means 76 of housing assembly 66.

Housing assembly 66 includes a brake reaction member 78, an oil distribution member 80 and an adaptor plate 82. Brake reaction member 78 includes spline means 76 and is attached to oil distribution member 80 by a set of splines 84 or by other means known well in the art. Oil distribution member 80 extends from brake reaction member 78 and defines a coolant oil input port 86, an input passage 88, a coolant oil return passage 90 and a return port 92. Oil distribution member 80 is secured to a stationary member of the press (not shown) in order to provide the anchoring point for brake assembly 18. Adaptor plate 82 is rotatably secured to oil distribution member 80 by a bearing 94 and secured to flywheel 12 by a plurality of bolts 96. A seal 98 is located between adaptor plate 82 and oil distribution member 80 to seal chamber 48. A second seal 100 is located between oil distribution member 80 and input shaft 14 to further seal chamber 48 and thus provide an oil tight chamber 48. An oil trough 102 may be utilized to collect any oil which may inadvertently leak from chamber 48 if desired.

Brake application member 68 is attached to clutch engagement member 28 by a plurality of bolts 104. Thus brake application member 68 and clutch engagement member 28 move axially as a single unit. Brake application member 68 defines a plurality of spring pockets 106 within which springs 32 are located. Thus, brake application member 68 acts as the reaction member against which the biasing load of springs 32 is exerted.

The operation of brake assembly 18 begins with brake assembly 18 being in the applied condition due the biasing of application member 68 to the right as shown in FIG. 1 by the plurality of springs 32. This same biasing load biases clutch engagement member 28 to the right to disengage clutch assembly 16 due to the attachment of brake application member 68 to clutch engagement member 28. The biasing of application member 68 to the right in FIG. 1 compresses the plurality of friction plates 62 and the plurality of reaction plates 64 together to apply brake assembly 18. In this applied condition, rotation of input shaft 14 is prohibited by the fact that brake reaction hub 60 which is locked to input shaft 14 is locked to brake reaction member 78 of brake housing assembly 66 which is in turn secured to a stationary member of the press. As stated above, in this position of brake application member 68 and thus clutch engagement member 28, flywheel 12 is free to rotate relative to input shaft 14. When it is desired to release brake assembly 18, fluid under pressure is supplied to chamber 50 through passage 54. Pressurized fluid within chamber 50 causes engagement member 28 and thus application member 68 to move axially to the left as shown in FIG. 1 against the biasing load of springs 32. When application member 68 moves to the left, the compression between the plurality of reaction plates 62 and reaction plates 64 is released and plates 62 are free to rotate relative to plates 64. As stated above, this movement to the left of engagement member 28 and application member 68 also compresses plates 22 and 24 to engage clutch assembly 16. Thus, the release of brake assembly 18 occurs generally simultaneous to the engagement of clutch assembly 16. When the pressurized fluid is released from chamber 50, brake assembly 18 is again urged into its applied condition due to the biasing of springs 32. As stated above, the release of pressurized fluid from chamber 50 also operates to disengage clutch assembly 16. Thus, the application of brake assembly 18 occurs generally simultaneous to the disengagement of clutch assembly 16.

The oil distribution system for press drive 10 begins by supplying cooling oil to input port 86 of oil distribution member 80. Oil flows from input port 86 and into chamber 48 through passage 88. A bypass passage 110 facilitates the flow of oil past bearing 94. Oil enters chamber 48 at its radially outer portion and is directed to the outer circumferential wall of chamber 48 due to brake reaction member 78. The cooling oil enters the gaps between the plurality of interleaved brake plates 62 and 64 and the gaps between the plurality of interleaved clutch plates 22 and 24 from the outer circumferential portion of chamber 48. This flow of oil is against the centrifugal forces exerted on the cooling oil due to the rotation of the various brake and clutch plates and operates to actually improve the oil flow within press drive 10. The oil proceeds through the plurality of brake plates 62 and 64 to enter the central portion of chamber 48. Oil also proceeds through the plurality of clutch plates 22 and 24 where it enters a return oil passage 112 extending through hub 20 to reach the central portion of chamber 48. From here, the cooling oil is removed from chamber 48 through return passage 90 and return port 92.

The direction of the oil flow for the present invention is opposite to the direction of fluid flow utilized in the prior art. Prior art lubrication systems supply oil to the inside portion of the drive unit and subsequently remove the oil from the outside portion of the drive unit. The rotation of the prior art drive units and the associated centrifugal force for the oil which is produced in the prior art drive units is in the direction of flow of the oil. Thus, there is a tendency in the prior art to increase the flow rate of the oil. Thus, should there be a momentary delay in the supply of oil to the inside portion of the prior art drive unit, the brake and clutch plates which are located on the outside portion of the drive unit would be momentarily starved of oil. This oil starving will result in the generation of heat and excessive wear between the brake and clutch plates.

The present invention by reversing the direction for the flow of the oil resolves prior art problems associated with momentary delay in the supply of oil, producing an unexpected increase in the performance of press drive 10. The centrifugal force created by the rotation of press drive 10 will impede the oil flow of the present invention because oil is fed to the outside of chamber 48 and oil is removed from the inside of chamber 48. The supply of oil to the outside of chamber 48 in combination with the centrifugal force produced by the rotation of press drive 10 will tend to keep the oil in the outside portion of chamber 48 in contact with plates 22, 24, 62 and 64. Thus, any momentary delay in the supply in oil will not starve press drive 10 and plates 22, 24, 62 and 64 will remain bathed in oil. In addition, any "hot spots" which may be created between adjacent plates 22, 24, 62 and 64 will increase the temperature of the oil in that localized area making this higher temperature oil lighter and thus less affected by centrifugal force. This lighter oil will tend to migrate to the inside of chamber 48. The cooler, heavier oil will be forced by centrifugal force to the outside of chamber 48 and into contact with plates 22, 24, 62 and 64 increasing the cooling rate for the developed "hot spot."

While the above detailed description describes the preferred embodiment of the present invention, it should be understood that the present invention is susceptible to modification, variation and alteration without deviating from the scope and fair meaning of the subjoined claims.

What is claimed is:

1. A drive assembly for a press having a flywheel, a frame and a drive shaft, said drive assembly comprising:

an oil shear brake unit adapted to be disposed between said frame and said drive shaft, said brake unit including a plurality of interleaved first friction disks adapted to be alternately attached, respectively, to said frame and said drive shaft;

an oil shear clutch unit adapted to be disposed between said flywheel and said drive shaft, said clutch unit including a plurality of interleaved second friction disks adapted to be alternately attached, respectively, to said flywheel and said drive shaft, said brake unit and said clutch unit defining a chamber, said chamber including an exterior wall defined by a continuously rotating member of said drive assembly;

an oil inlet extending into said chamber, said oil inlet providing cooling oil to a radial outer portion of said chamber, said cooling oil being urged toward said exterior wall due to centrifugal forces generated by said continuously rotating member of said drive assembly;

an oil outlet extending into said chamber, said oil inlet removing cooling oil from a central portion of said chamber; and an oil flow passage extending between said oil inlet and said oil outlet, said first and second friction disks being disposed within said oil flow passage, said cooling oil flowing from said oil inlet to said oil outlet against said urging of said cooling oil by said centrifugal forces.

2. The drive assembly according to claim 1 further comprising a biasing member for urging said brake unit from a released condition to an applied condition and for urging said clutch unit from an engaged condition to a disengaged condition.

3. The drive assembly according to claim 1 wherein, said clutch unit includes a clutch hub, said clutch hub defining a fluid passage extending between said second friction disks and said central portion of said chamber.

4. The drive assembly according to claim 3 wherein, said brake unit includes a brake hub.

5. The drive assembly according to claim 4 wherein, said clutch hub is integral with said brake hub.

6. The drive assembly according to claim 1 wherein, said clutch unit includes a clutch hub and said brake unit includes a brake hub, said clutch hub being integral with said brake hub.

7. A drive assembly for a press having a flywheel, a frame and a drive shaft, said drive assembly comprising:

an oil shear brake unit comprising:
a brake reaction member adapted for mating with said frame;
a brake hub adapted for mating with said drive shaft; and
a plurality of interleaved brake friction plates alternately attached, respectively, to said brake reaction member and said brake hub;

an oil shear clutch unit comprising:
a clutch housing adapted for mating with said flywheel;
a clutch hub adapted for mating with said drive shaft; and
a plurality of interleaved clutch friction plates alternately attached, respectively, to said clutch housing and said clutch hub;

a chamber defined by said oil shear brake unit and said oil shear clutch unit, said chamber including an exterior wall defined by a continuously rotating member of said drive assembly;

an activation member disposed within said chamber between said brake unit and said clutch unit, said activation member movable between a first position wherein said clutch unit is in a disengaged condition and said brake unit is in an applied condition and a second position wherein said clutch unit is in an engaged condition and said brake unit is in a released condition;

an oil inlet extending into said chamber, said oil inlet providing cooling oil to an outer radial portion of one of said brake friction plates and said clutch friction plates, said cooling oil being urged toward said exterior wall due to centrifugal forces generated by said continuously rotating member of said drive assembly;

an oil outlet disposed adjacent to a central portion of one of said brake friction plates and said clutch friction plates;

an oil flow passage extending between said oil inlet and said oil outlet, said brake friction plates and said clutch friction plates being disposed within said oil flow passage, said cooling oil flowing from said oil inlet to said oil outlet against said urging of said cooling oil by said centrifugal forces.

8. The drive assembly according to claim 7 further comprising a biasing member for urging said activation member into said first position.

9. The drive assembly according to claim 7 wherein, said clutch hub includes a fluid passage between said clutch friction plates and said oil outlet.

10. The drive assembly according to claim 7 wherein, said clutch hub is integral with said brake hub.

11. The drive assembly according to claim 10 wherein, said clutch hub includes a fluid passage between said clutch friction plates and said oil outlet.

* * * * *